UNITED STATES PATENT OFFICE.

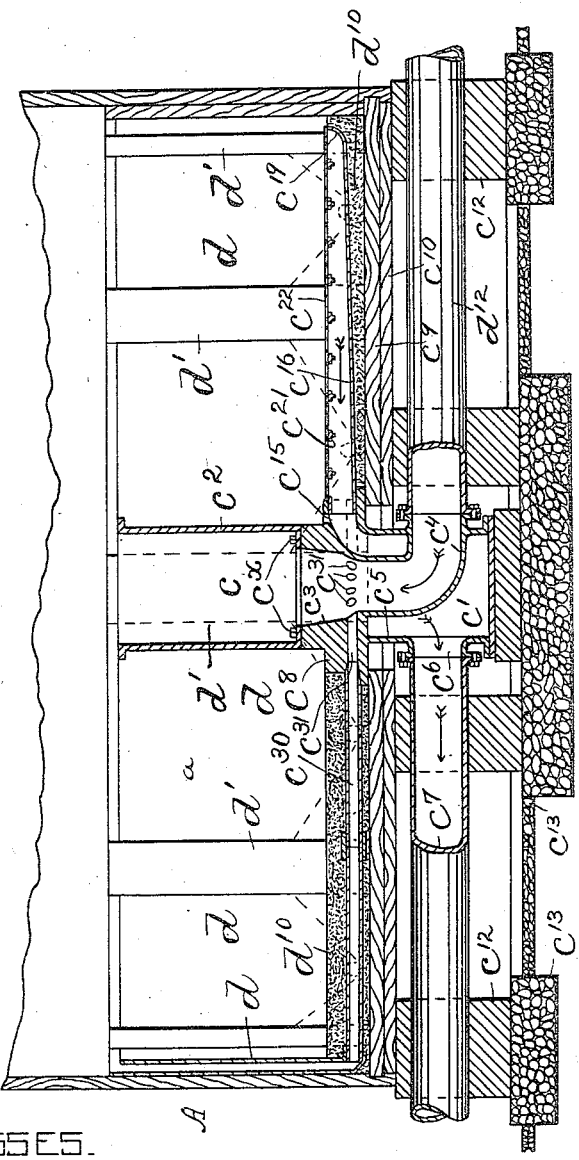

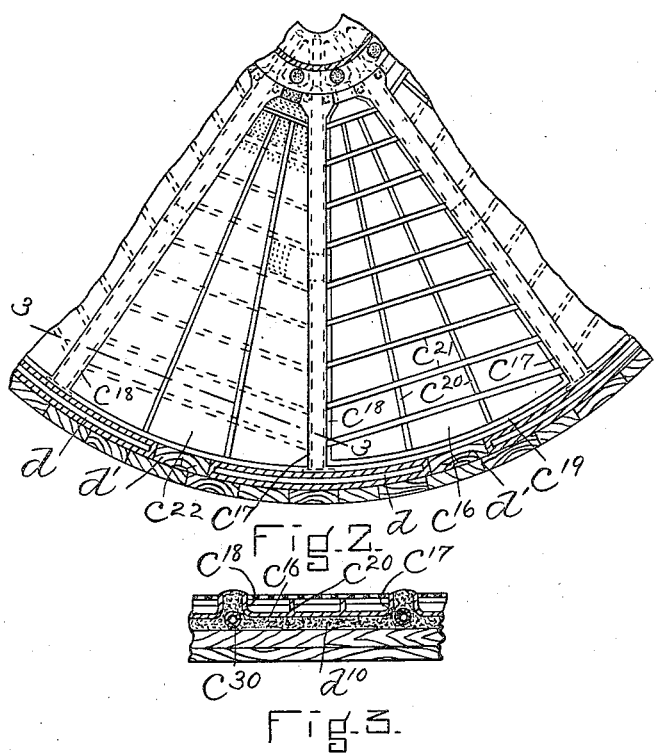

FRANKLIN AGGE, OF SALEM, AND WALTER B. NYE, OF BROOKLINE, MASSACHUSETTS, ASSIGNORS, BY MESNE ASSIGNMENTS, TO THE NEW YORK FILTER MANUFACTURING COMPANY, OF NEW JERSEY.

FILTER.

SPECIFICATION forming part of Letters Patent No. 617,871, dated January 17, 1899.

Original application filed December 31, 1897, Serial No. 664,899. Divided and this application filed November 2, 1898. Serial No. 695,280. (No model.)

*To all whom it may concern:*

Be it known that we, FRANKLIN AGGE, residing in Salem, in the county of Essex, and WALTER B. NYE, residing in Brookline, in the county of Norfolk, State of Massachusetts, citizens of the United States, have invented an Improvement in Filters, of which the following description, in connection with the accompanying drawings, is a specification, like letters on the drawings representing like parts.

This invention relates to filters and is a division of our application, Serial No. 664,899, filed December 31, 1897; and it consists in an efficient and novel construction of the filter tank or vessel, as will be described.

Figure 1 is a sectional detail, on an enlarged scale, of the lower portion of the filter tank or vessel; Fig. 2, a detail in plan of a portion of the filter tank or vessel shown in Fig. 1; Fig. 3, a sectional detail, to be referred to, the section being taken on the line 3 3, Fig. 2.

The tank or vessel A, of circular form and of a novel construction, as will be described, contains within it a filter-bed $a$ of sand or other suitable granular material. The filter tank or vessel is provided with a bottom composed of a series of sectional collecting trays or pans radiating from and connected to a central well, which is provided with two distinct chambers $c\ c'$. The chamber $c$ is formed, as shown, by a substantially large cylinder $c^2$ and the enlarged mouth or upper part of a pipe $c^4$, to which the cylinder is secured, as by bolts $c^\times$, the pipe $c^4$ being extended down into and laterally through the chamber $c'$, which is formed by a cylinder $c^5$, integral with the pipe $c^4$.

The cylinder $c^5$ is provided with a flanged opening $c^6$, to which is bolted or otherwise secured a pipe $c^7$, and at its upper end the cylinder $c^5$ is provided with a substantially thick annular flange $c^8$, which rests upon a wooden or other bottom wall of the tank or vessel, as shown in Fig. 2. In the present instance the bottom wall of the tank or vessel is represented as formed by two layers $c^9\ c^{10}$ of wood, which rest upon brick or other supports $c^{12}$, set upon a foundation $c^{13}$ of cement or other suitable solid material.

The thickened flange $c^8$ is provided with suitable ports or passages $c^{15}$, which communicate with the chamber $c'$ and with which are connected the collecting pans or trays forming the bottom proper for the filter tank or vessel. The trays referred to may and preferably will be made as herein shown, and consist of a bottom plate $c^{16}$, inclined downward from its outer end toward its inner end, and upright side walls $c^{17}\ c^{18}$ (see Fig. 3) and an upright outer rim $c^{19}$. (See Fig. 1.) The trays or pans may be provided with one or more longitudinal upright ribs or webs $c^{20}$, upon which rest cross-bars $c^{21}$, which serve to support the foraminous or perforated top $c^{22}$ for the said tray or pan. The top $c^{22}$ may and preferably will be made in sections of plates or strips of copper, brass, or bronze provided with substantially fine perforations, some only of which are shown in Fig. 2. The upright side walls $c^{17}\ c^{18}$ of the collecting-trays are preferably made so that their upper edges are in a substantially horizontal plane with the upper edge of the rim $c^{19}$, so as to support the perforated top $c^{22}$ in a horizontal plane, and thereby form a horizontal surface upon which the filter-bed $a$ may rest. The upright side walls $c^{17}\ c^{18}$ of the trays converge from the outer rim $c^{19}$ toward the inner end of the tray (see Fig. 2) and are extended into or connected with the ports or passages $c^{15}$ in the thickened flange $c^8$.

The radiating-trays with their perforated or foraminous tops form radiating-sections of the perforated supporting-bottom for the filter-bed, and are preferably arranged about the central well, so as to leave radiating-spaces between them, in which are placed pipes $c^{30}$, which communicate at their inner end with the chamber $c$ through ports or passages $c^{31}$ in the thickened flange $c^8$ and which communicate at their outer ends with curved castings or gutter-wells $d$, arranged in a circle about the lower part of the tank or vessel A and separated by spaces, which are filled with pieces $d'$, preferably of wood and of substantially the thickness of the gutter-castings, so as to form with the inner side of said castings a substantially smooth continuous circumferential inner wall for the lower part or half of the tank or vessel A containing the filter-bed. The gutter-castings form circumferential wells and extend above the filter-bed, so as to connect the water-space above the filter-bed with the chamber $c$ of the central well. The collecting-trays of the sectional bottom and the pipes $c^{30}$ are embedded in a substantially thick layer of cement $d^{10}$, as shown in Fig. 3.

The pipe $c^4$ has bolted or otherwise secured to it a pipe $d^{12}$, which is extended below the bottom of the filter-tank to the outside thereof. The chamber $c'$ of the central well has connected to it the pipe $c^7$, extended in a substantially opposite direction below and beyond the filter.

In operation with the filter herein shown the water to be filtered is allowed to flow into the filter-tank above the filter-bed through the supply-pipe $d^{12}$, the pipe $c^4$, and upper chamber $c$ of the center well and also through the pipes $c^{30}$ and gutter-wells $d$. The unfiltered water percolates through the filter-bed into the collecting pans or trays, from which it flows through the ports $c^{15}$ into the lower chamber $c'$ of the central well, and from this chamber it passes through the outlet-pipe $c^7$.

When it is desired to wash the filter-bed, filtered water is forced through the pipe $c^4$ into the chamber $c'$, thence through the ports $c^{15}$ and collecting-trays into and up through the filter-bed, and after passing through the filter-bed the wash-water, with the impurities, passes down through the chamber $c$ of the central well and also into said chamber through the gutter-wells $d$ and pipes $c^{30}$, and thence through the pipes $c^4$ $d^{12}$ to the sewer or other depository for the wash-water.

We claim—

1. In a filter, the combination of the following instrumentalities, viz: a tank or vessel, a filter-bed contained therein, a central well composed of an upper chamber extended up through the filter-bed and a lower chamber separate from the upper chamber and extended below the bottom of the tank or vessel, a series of trays or pans communicating with the said lower chamber and provided with foraminous or perforated tops upon which the filter-bed rests, an outlet-pipe connected to said lower chamber, and a supply-pipe communicating with the upper chamber, substantially as described.

2. In a filter, the combination of the following instrumentalities, viz: a tank or vessel, a filter-bed therein, a central well, and a series of sectional pans or trays provided with foraminous tops to support the filter-bed and communicating with the central well, substantially as described.

In testimony whereof we have signed our names to this specification in the presence of two subscribing witnesses.

FRANKLIN AGGE.
WALTER B. NYE.

Witnesses:
JAS. H. CHURCHILL,
J. MURPHY.